United States Patent
Yamagata

(10) Patent No.: US 11,007,930 B2
(45) Date of Patent: May 18, 2021

(54) LIGHTING DEVICE

(71) Applicant: ALPS ALPINE CO., LTD., Tokyo (JP)

(72) Inventor: Kazuyoshi Yamagata, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/880,054

(22) Filed: May 21, 2020

(65) Prior Publication Data
US 2020/0282904 A1 Sep. 10, 2020

Related U.S. Application Data

(63) Continuation of application No. PCT/JP2018/038272, filed on Oct. 15, 2018.

(30) Foreign Application Priority Data

Nov. 30, 2017 (JP) .............................. JP2017-230112

(51) Int. Cl.
| | |
|---|---|
| *B60Q 3/00* | (2017.01) |
| *B60Q 3/20* | (2017.01) |
| *B60Q 3/64* | (2017.01) |
| *F21V 23/04* | (2006.01) |

(52) U.S. Cl.
CPC ................. *B60Q 3/20* (2017.02); *B60Q 3/64* (2017.02); *F21V 23/04* (2013.01); *F21V 2200/00* (2015.01)

(58) Field of Classification Search
CPC .. B60Q 3/20; B60Q 3/64; F21V 23/04; F21V 2200/00; F21Y 2103/10; H01H 3/12
See application file for complete search history.

(56) References Cited

U.S. PATENT DOCUMENTS

| | | | |
|---|---|---|---|
| 7,121,709 B2 | 10/2006 | Shinohara et al. | |
| 2006/0034092 A1* | 2/2006 | Okazaki | B60Q 3/12 362/489 |
| 2007/0159846 A1 | 7/2007 | Nishiyama et al. | |
| 2014/0355303 A1* | 12/2014 | Fujiuchi | G02B 6/0073 362/611 |

(Continued)

FOREIGN PATENT DOCUMENTS

| | | |
|---|---|---|
| JP | 2003-215584 | 7/2003 |
| JP | 2004-186018 | 7/2004 |
| JP | 2007-188681 | 7/2007 |

(Continued)

OTHER PUBLICATIONS

International Search Report for PCT/JP2018/038272 dated Jan. 15, 2019.

(Continued)

*Primary Examiner* — Y M. Quach Lee
(74) *Attorney, Agent, or Firm* — IPUSA, PLLC

(57) ABSTRACT

A lighting device includes a light guide that propagates incoming light, and a lighting panel including a lighting region. A front side of the lighting panel excluding the lighting region is configured to prevent transmission of light, the light guide is covered by the lighting panel, the lighting device is configured such that the light emitted from the light guide passes through the lighting region of the lighting panel for illumination, and surfaces of the lighting panel surrounding the light guide are white in color.

3 Claims, 16 Drawing Sheets

(56) References Cited

U.S. PATENT DOCUMENTS

2015/0003093 A1  1/2015 Omura et al.
2018/0172896 A1* 6/2018 Ueno .................. G02B 6/0046

FOREIGN PATENT DOCUMENTS

| JP | 2012-142230 | 7/2012 |
| JP | 2014-063680 | 4/2014 |
| JP | 2015-9663   | 1/2015 |
| JP | 2015-111519 | 6/2015 |
| JP | 2015-111520 | 6/2015 |

OTHER PUBLICATIONS

Office Action dated Dec. 8, 2020 issued with respect to the corresponding Japanese Patent Application No. 2019-557056.

* cited by examiner

LIGHTING DEVICE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/038272, filed on Oct. 15, 2018, which is based on and claims priority to Japanese Patent Application No. 2017-230112 filed on Nov. 30, 2017, the entire contents of which are incorporated herein by reference.

BACKGROUND OF THE INVENTION

1. Field of the Invention

An aspect of this disclosure relates to a lighting device.

2. Description of the Related Art

Inside of an automobile, a lighting device including an annular light guide and a light-emitting element such as a light-emitting diode (LED) is often provided to improve the visibility of an operation part such as a push button or a jog dial. A lighting region of such a lighting device preferably emits light with even and uniform luminance. For this purpose, a related-art lighting device has a configuration where protrusions are provided on a light-emitting surface of a light guide (see, for example, Japanese Unexamined Patent Application Publication No. 2015-111520, Japanese Unexamined Patent Application Publication No. 2015-111519, and Japanese Unexamined Patent Application Publication No. 2003-215584).

Also, there is an automobile including an operation switch for operating a power seat in the automobile, and a lighting device is often provided around such an operation switch. Such a lighting device, for example, has a shape imitating the side shape of the power sheet and emits light to facilitate operations of the operation switch at night.

The side shape of a power seat is not formed of simple straight lines or a circle, but is a complex shape formed by combining straight lines and multiple curves with different curvatures. Accordingly, the luminance of the lighting device may vary between a portion having a larger curvature (a portion having a smaller radius of curvature), and a portion having a smaller curvature (a portion having a larger radius of curvature) and a straight portion. If the luminance of a lighting device becomes uneven, the quality of the lighting device may be reduced, and the luxuriousness may be reduced. Particularly, such uneven luminance is not desirable for a luxury car.

SUMMARY OF THE INVENTION

In an aspect of this disclosure, there is provided a lighting device including a light guide that propagates incoming light, and a lighting panel including a lighting region. A front side of the lighting panel excluding the lighting region is configured to prevent transmission of light, the light guide is covered by the lighting panel, the lighting device is configured such that the light emitted from the light guide passes through the lighting region of the lighting panel for illumination, and surfaces of the lighting panel surrounding the light guide are white in color.

DESCRIPTION OF THE PREFERRED EMBODIMENTS

For the reasons described above, there is a demand for a lighting device including a lighting region that has a complex shape and can still emit light with uniform luminance.

An embodiment of the present invention is described below with reference to the accompanying drawings. The same reference number is assigned to the same component throughout the drawings, and repeated descriptions of the same component may be omitted.

(Power Seat Switch)

Figure 1:
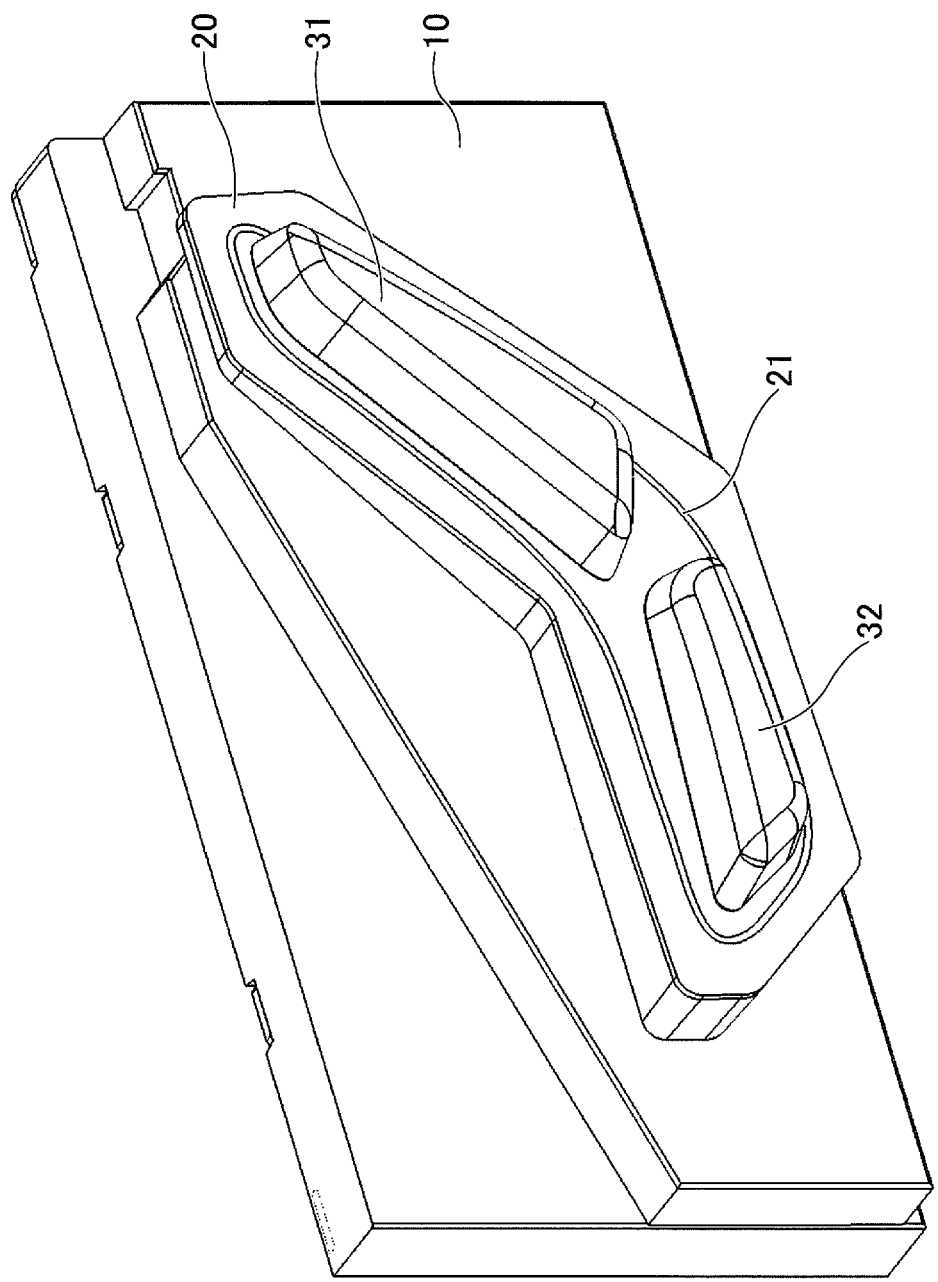
FIG. 1 is a perspective view of a power seat switch including a lighting device according to an embodiment.
Figure 2:
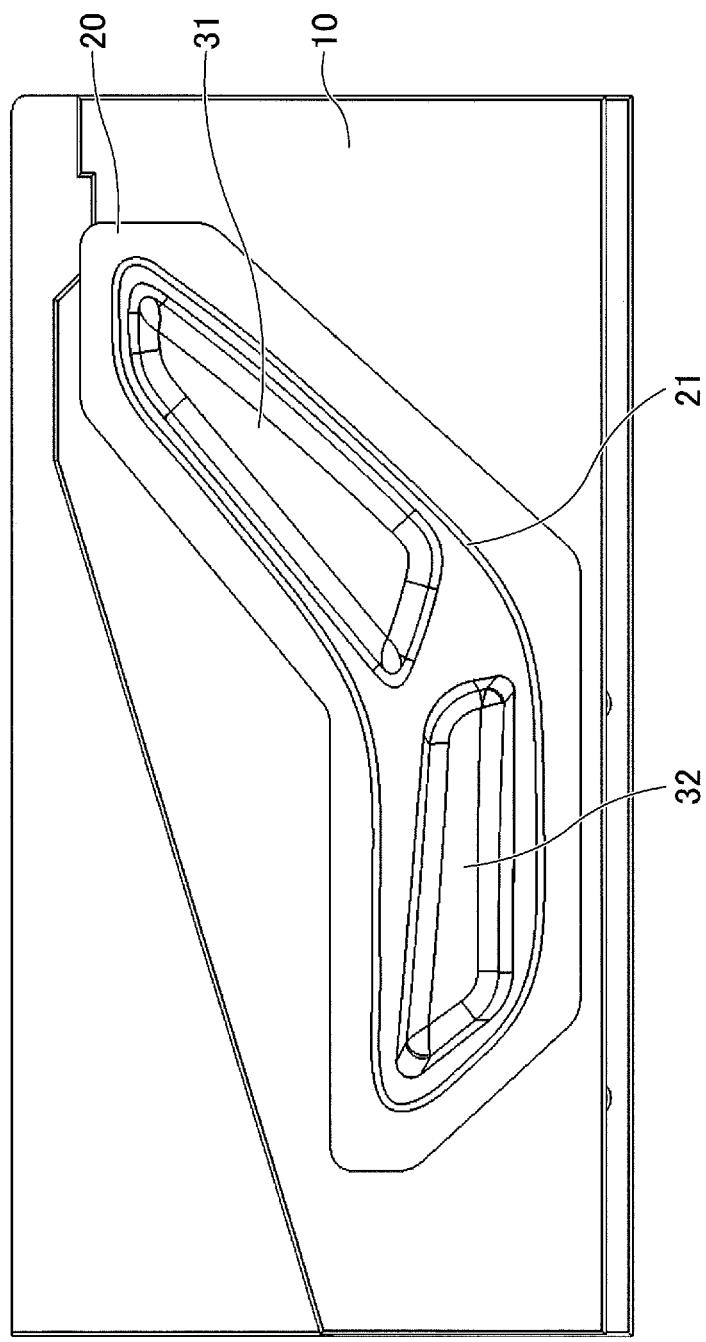
FIG. 2 is a front view of the power seat switch including the lighting device according to the embodiment.

First, a power seat switch including a lighting device according to the present embodiment is described. FIG. 1 is a perspective view and FIG. 2 is a front view of the power seat switch. The power seat switch is disposed, for example, on the inner side of a door of an automobile. Specifically, a lighting panel 20 is attached to the inner side of the door, and knobs 31 and 32 for operating the power seat switch are provided on the lighting panel 20. In the descriptions of the present embodiment, it is assumed that a housing 10 corresponds to the inner side of the door. For example, a switch body for controlling the movement of the power seat and a mechanism for operating the switch body are provided inside of the housing 10.

The lighting panel 20 is shaped like a box and includes a lighting region 21 through which light leaks. Except for the lighting region 21, the outer side of the entire lighting panel 20 has a black color. The lighting region 21 has an annular shape that imitates the side shape of the power seat. The knobs 31 and 32 are directly touched and manipulated by a person (user) to operate the power seat switch and are attached to the outer side of the lighting panel 20. The knob 31 is an operation part for operating a portion of the power seat corresponding to the upper body, and the knob 32 is an operation part for operating a portion of the power seat corresponding to the lower body. The knobs 31 and 32 are disposed in positions in a region inside of (or surrounded by) the lighting region 21 such that the user can intuitively recognize the corresponding portions of the power seat.

Figure 3:
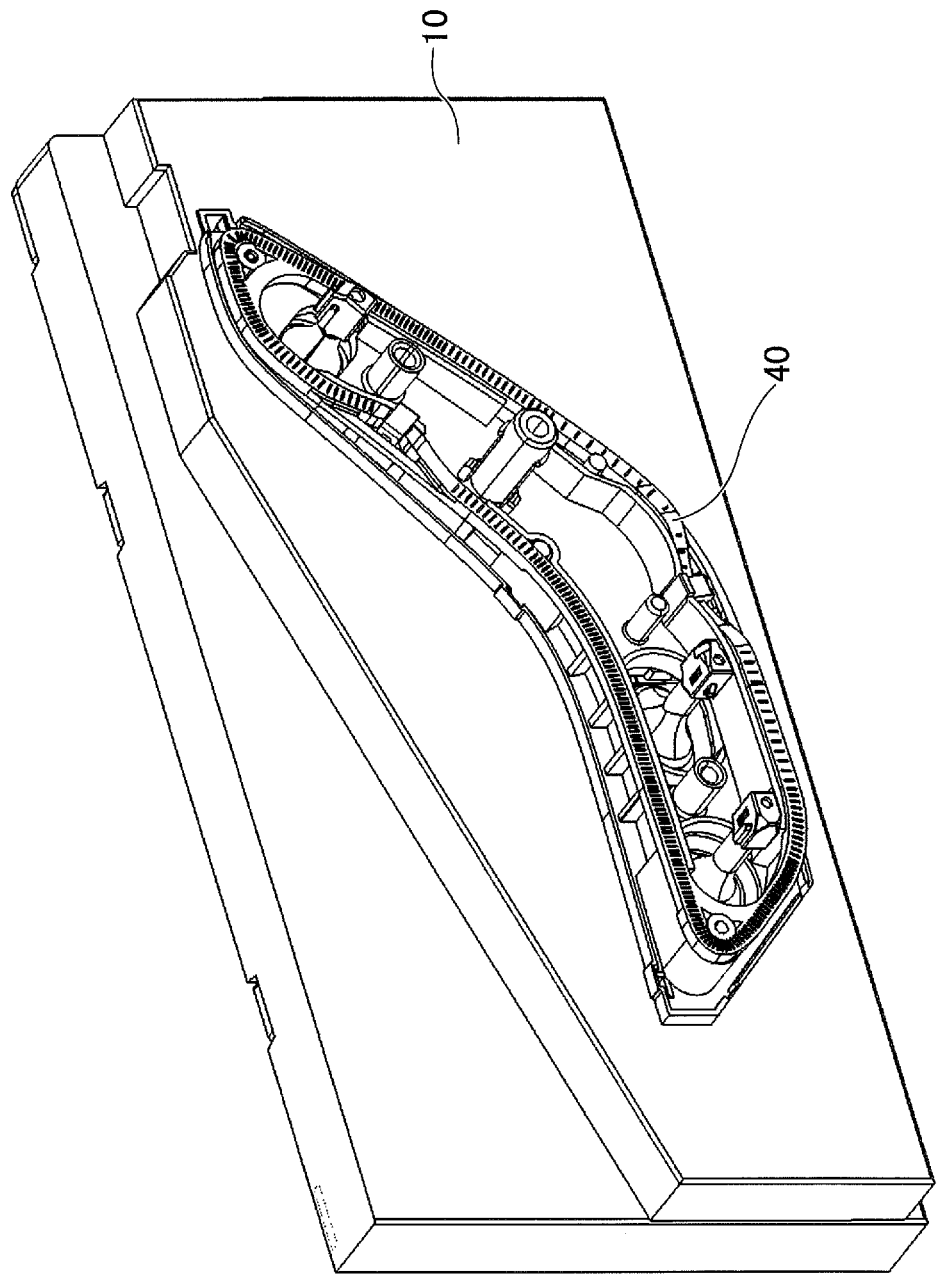
FIG. 3 is a perspective view of the power seat switch from which knobs and a lighting panel are removed.
Figure 4:
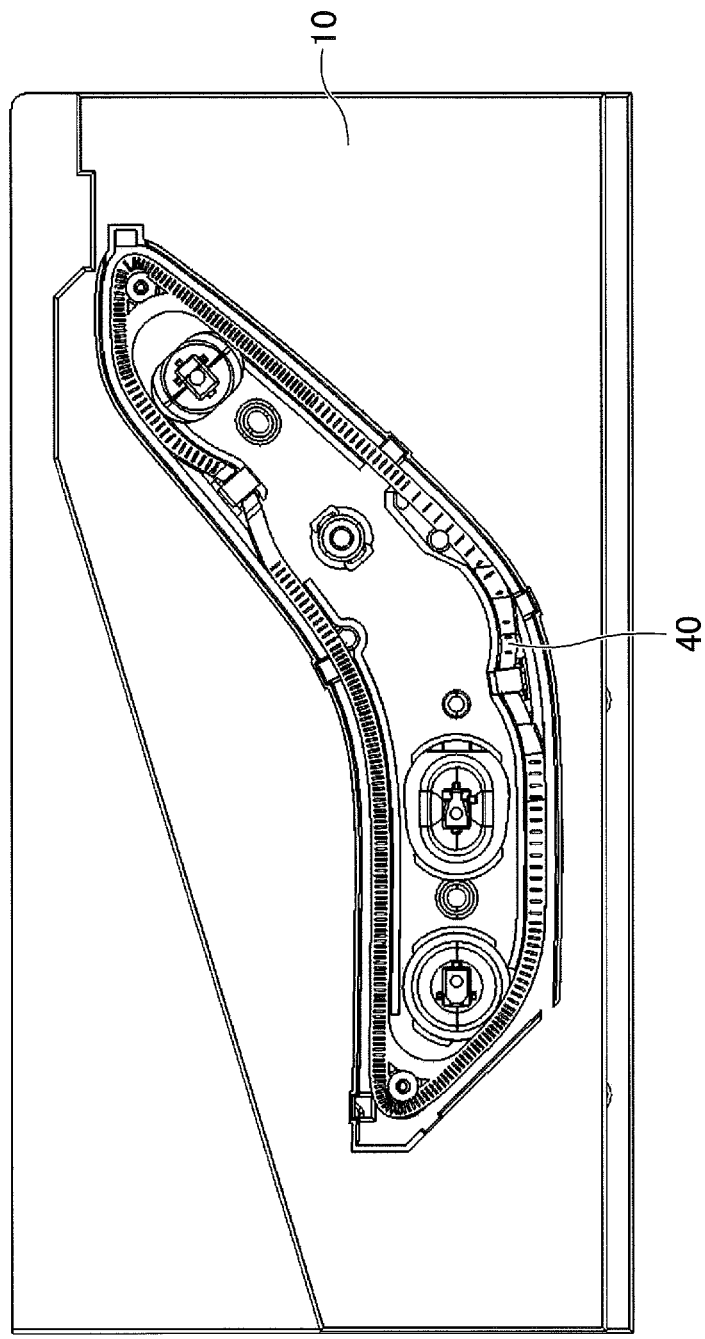
FIG. 4 is a front view of the power seat switch from which the knobs and the lighting panel are removed.

As illustrated in FIG. 3 and FIG. 4, a light guide 40 corresponding to the shape of the lighting region 21 of the lighting panel 20 is provided inside of the lighting panel 20. FIG. 3 is a perspective view and FIG. 4 is a front view of the power seat switch from which the lighting panel 20 and the knobs 31 and 32 are removed. As described later, the power seat switch includes light-emitting elements such as LEDs, and light emitted from the light-emitting elements enter the light guide 40. Multiple protrusions are provided on the surface of the light guide 40, and light is scattered by and output from the protrusions. The light from the inside of the lighting panel 20 leaks to the outside through the lighting region 21 of the lighting panel 20. As a result, the lighting region 21 of the lighting panel 20 having a shape imitating the side shape of the power seat emits light, and the user can recognize the positions of the knobs 31 and 32 for operating the power seat switch even at night.

(Light Guide)

Figure 5:
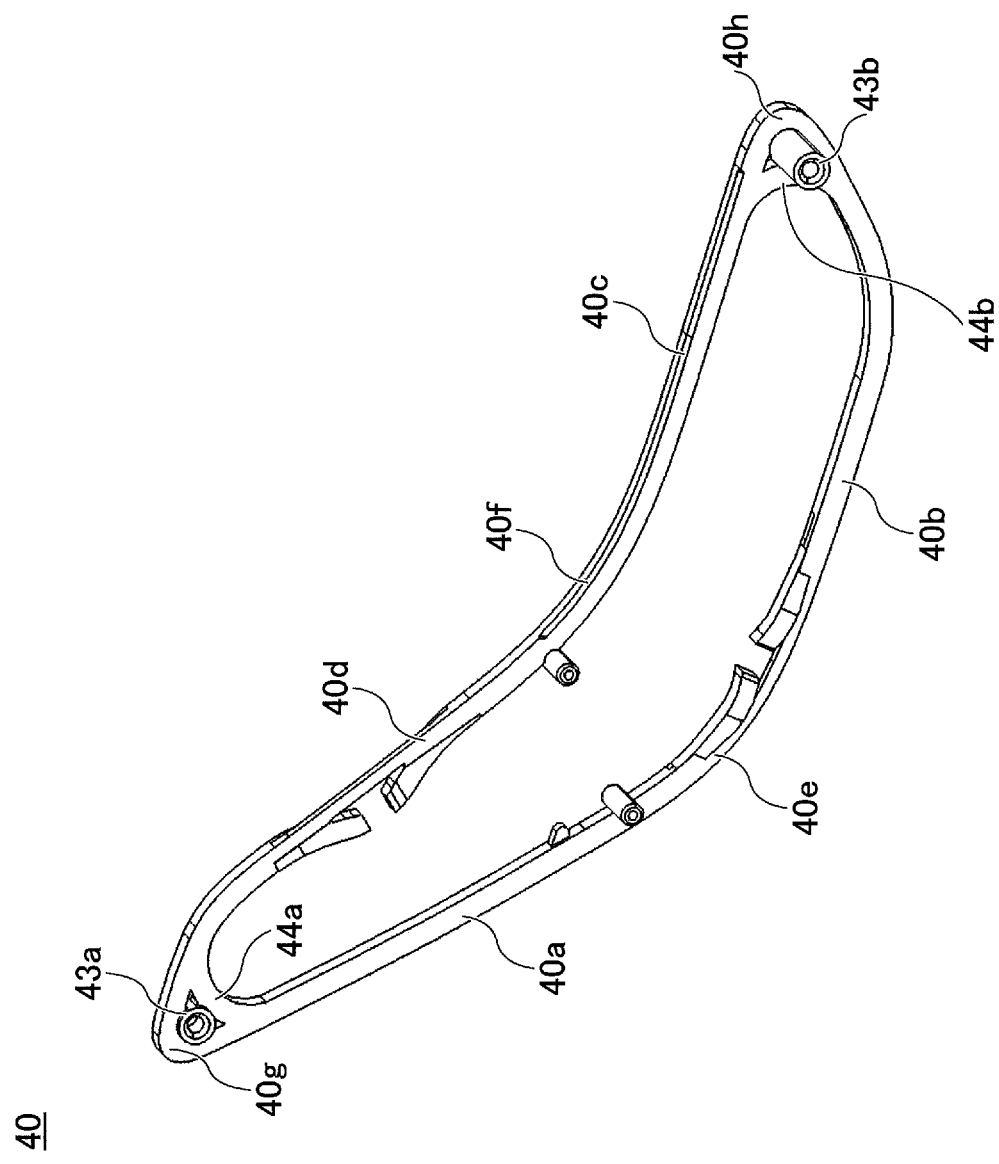
FIG. 5 is a perspective view of a light guide of the lighting device according to the embodiment.
Figure 6:
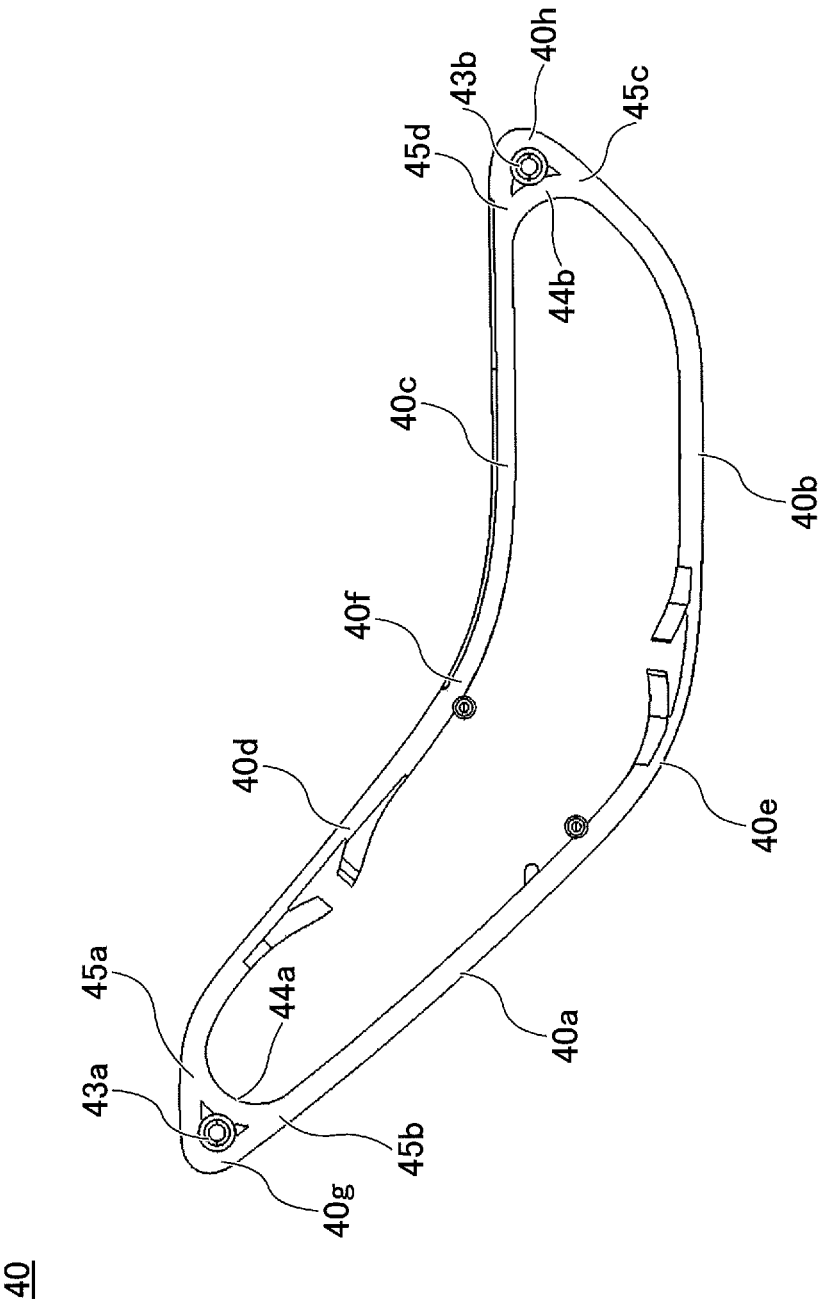
FIG. 6 is a rear view of the light guide of the lighting device according to the embodiment.
Figure 7:
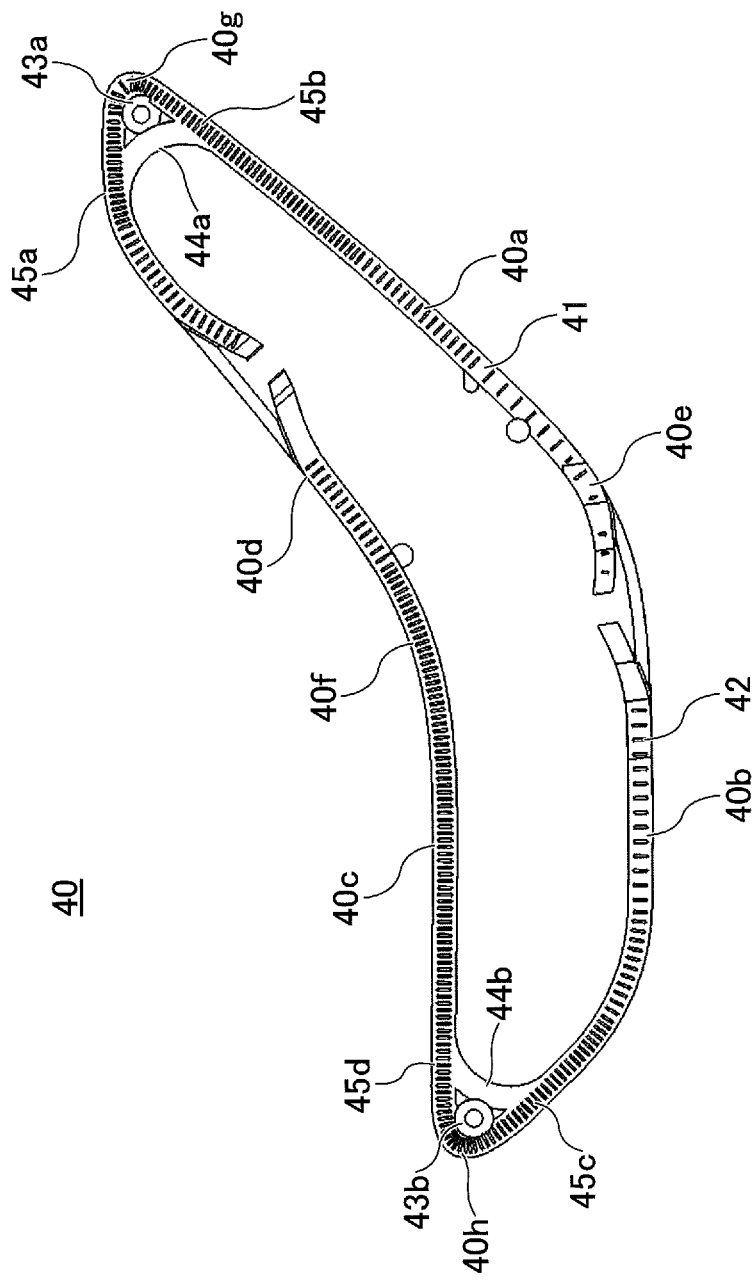
FIG. 7 is a front view of the light guide of the lighting device according to the embodiment.

Next, the light guide 40 of the lighting device of the present embodiment is described with reference to FIGS. 5 through 7. FIG. 5 is a rear perspective view, FIG. 6 is a rear view, and FIG. 7 is a front view of the light guide 40. The light guide 40 is formed of, for example, a light-transmitting transparent resin material such as transparent polycarbonate. The light guide 40 is provided to cause the lighting region 21 of the lighting panel 20 to emit light and therefore has a shape corresponding to the shape of the lighting region 21, i.e., a shape imitating the side shape of the power seat. The light guide includes linear sections 40a, 40b, 40c, and 40d, smaller-curvature curved sections 40e and 40f having smaller curvatures, and larger-curvature curved sections 40g and 40h having larger curvatures.

Multiple protrusions 42 are provided on a radiating surface 41 on the front side of the light guide 40, i.e., on the surface facing the inner side of the lighting panel 20, to radiate light. The light guide 40 also includes supports 43a and 43b near the larger-curvature curved sections 40g and 40h disposed at the corresponding ends of the light guide 40. Connecting sections 44a and 44b are provided inside of the supports 43a and 43b.

Specifically, the connecting section 44a having a curvature smaller than the curvature of the larger-curvature curved section 40g of the light guide 40 is provided inside of the larger-curvature curved section 40g. The larger-curvature curved section 40g and the connecting section 44a are connected at connecting parts 45a and 45b of the light guide 40, and the support 43a is disposed between the larger-curvature curved section 40g and the connecting section 44a. Similarly, the connecting section 44b having a curvature smaller than the curvature of the larger-curvature curved section 40h of the light guide 40 is provided inside of the larger-curvature curved section 40h. The larger-curvature curved section 40h and the connecting section 44b are connected at connecting parts 45c and 45d of the light guide 40, and the support 43b is disposed between the larger-curvature curved section 40h and the connecting section 44b.

Figure 8:
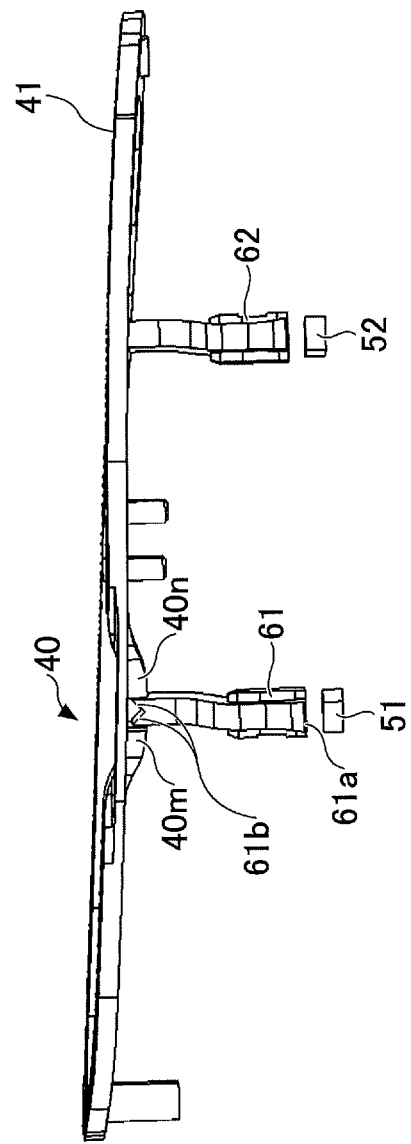
FIG. 8 is a drawing illustrating light-emitting elements of the lighting device according to the embodiment.

As illustrated in FIG. 8, the lighting device of the present embodiment includes light-emitting elements 51 and 52 such as LEDs. A light guide 61 is provided between the light-emitting element 51 and the light guide 40, and a light guide 62 is provided between the light-emitting element 52 and the light guide 40. The light-emitting elements 51 and 52 are white LEDs and emit white light.

The light emitted from the light-emitting element 51 enters an end 61a of the light guide 61, propagates through the light guide 61, is reflected by a reflecting surface 61b at the other end of the light guide 61, enters entry parts 40m and 40n of the light guide 40, and propagates through the light guide 40. Similarly, the light emitted from the light-emitting element 52 enters one end of the light guide 62, propagates through the light guide 62, is reflected by a reflecting surface at the other end of the light guide 62, enters the light guide 40, and propagates through the light guide 40. Thus, the light emitted from the two light-emitting elements 51 and 52 enters the light guide 40 and propagates through the light guide 40.

The refractive index of polycarbonate forming the light guide 40 is about 1.59, and the refractive index of air is about 1. Accordingly, when light enters the light guide 40, the light is totally reflected at the interface, e.g., the side surface of the light guide 40, between the light guide 40 and the air, and propagates through the light guide 40. In the light guide 40, multiple protrusions 42 are provided on the radiating surface 41 for emitting light. Light is scattered by the protrusions 42 and emitted from the radiating surface 41 to the outside of the light guide 40.

In the present embodiment, as illustrated in FIG. 7, the interval between the protrusions 42 is relatively wide near the light-emitting elements 51 and 52 and becomes narrower as the distances from the light-emitting elements 51 and 52 increase so that the light is uniformly emitted from the radiating surface 41 of the light guide 40. Also, in the linear sections 40a, 40b, 40c, and 40d and the smaller-curvature curved sections 40e and 40f, the interval between the protrusions 42 is relatively wide; and in the larger-curvature curved sections 40g and 40h, the interval between the protrusions 42 is relatively narrow.

Figure 9:
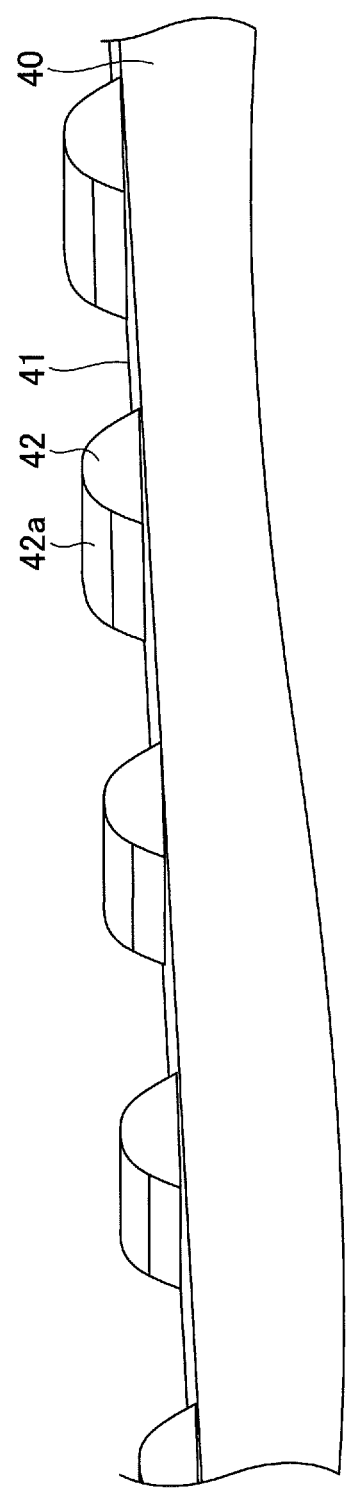
FIG. 9 is a drawing illustrating protrusions.
Figure 10:
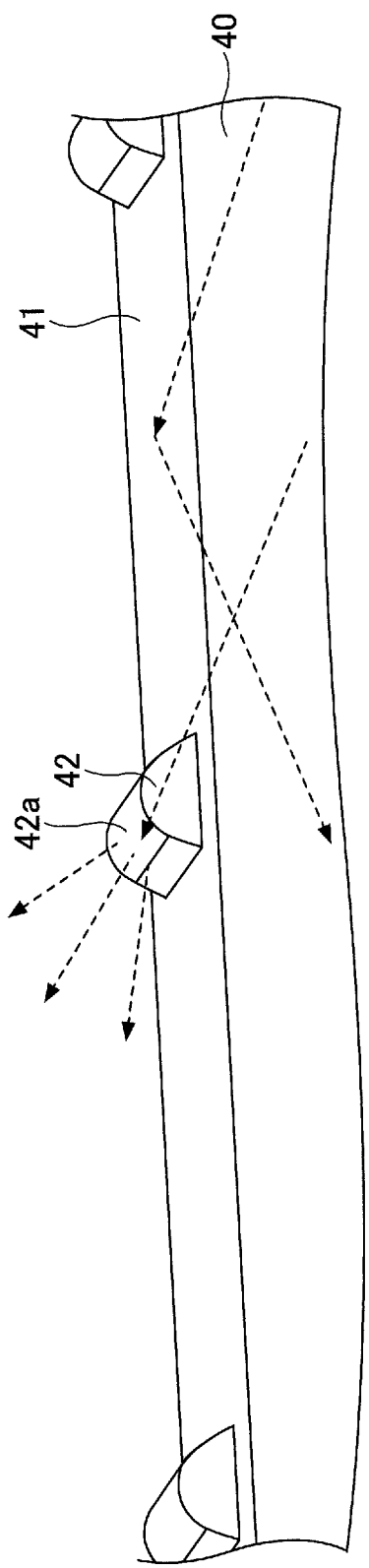
FIG. 10 is another drawing illustrating the protrusions.

As illustrated in FIGS. 9 and 10, the side shape of each protrusion 42 may be a semi-cylindrical convex shape instead of a rectangular shape. FIG. 9 is a side view and FIG. 10 is a perspective view of a portion of the light guide 40 where the protrusions 42 are formed. The protrusion 42 has a semi-cylindrical convex shape and includes a top part 42a having a curved surface and a flat part that extends continuously from an end of the top part 42a and has a flat surface. As illustrated in FIG. 10, light entering the protrusion 42 also exits from the curved surface of the top part 42a of the protrusion 42, and the light exiting from the curved surface of the top part 42a scatters at various angles. As a result, the proportion of light emitted from the radiating surface 41 increases. For example, this makes it possible to prevent a problem where a large amount of light exits from a surface perpendicular to the radiating surface 41 of the light guide 40 in a direction along the radiating surface 41 and the light intensity becomes uneven. Also, because the top part 42a of the protrusion 42 has a curved surface and is not sharp, the protrusion 42 is less likely to be damaged. The protrusion 42 may have a smooth surface. However, forming the protrusion 42 to have a rough surface makes it possible to more effectively scatter the light. The protrusion 42 may be formed to have a rough surface by not performing a finishing process when producing a mold used to form the light guide 40. The light guide 40 may be formed of, for example, polycarbonate or an acrylic resin having high light transmittance.

Here, as illustrated in FIGS. 5 through 7, the light guide 40 includes the larger-curvature curved sections 40g and 40h that have a small radius of curvature. In the larger-curvature curved sections 40g and 40h, because the radius of curvature is small, the proportion of light entering the side surface of the light guide 40 at an angle smaller than the critical angle becomes high. The light entering the side surface of the light guide 40 at an angle smaller than the critical angle leaks out of the light guide 40. For example, in the case of polycarbonate whose refractive index is about 1.59, light entering the side surface of the light guide 40 at an incident angle of less than or equal to 39 degrees leaks out of the light guide 40. The light leaked from the side surface of the light guide 40 is not directed to the lighting region 21. When the leakage of light increases in the larger-curvature curved sections 40g and 40h of the light guide 40, the amount of light propagating through the larger-curvature curved sections 40g and 40h and the following sections decreases. Therefore, dark portions may be generated in the lighting region 21 of the lighting panel 20, and the luminance in the lighting region 21 becomes uneven.

(Lighting Panel)

Figure 11:
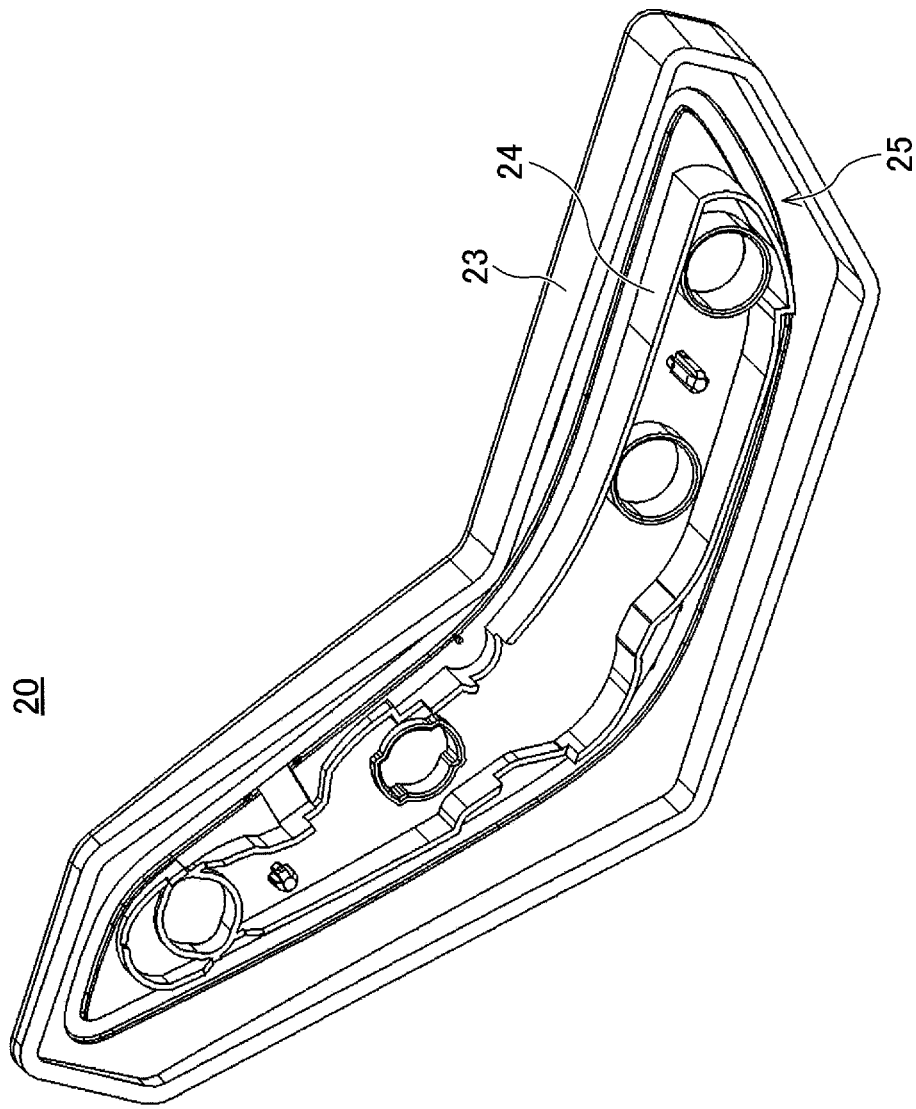
FIG. 11 is a perspective view of a lighting panel of the lighting device according to the embodiment.
Figure 12:
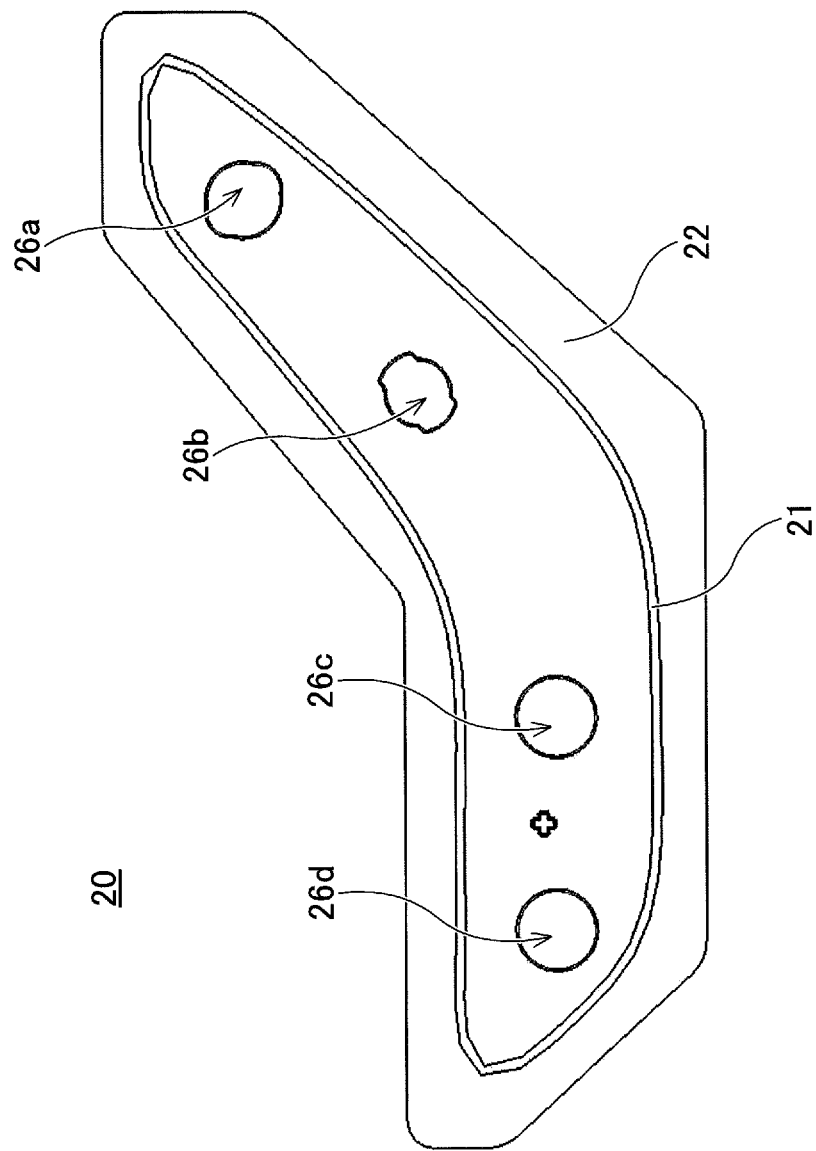
FIG. 12 is a front view of the lighting panel of the lighting device according to the embodiment.
Figure 13:
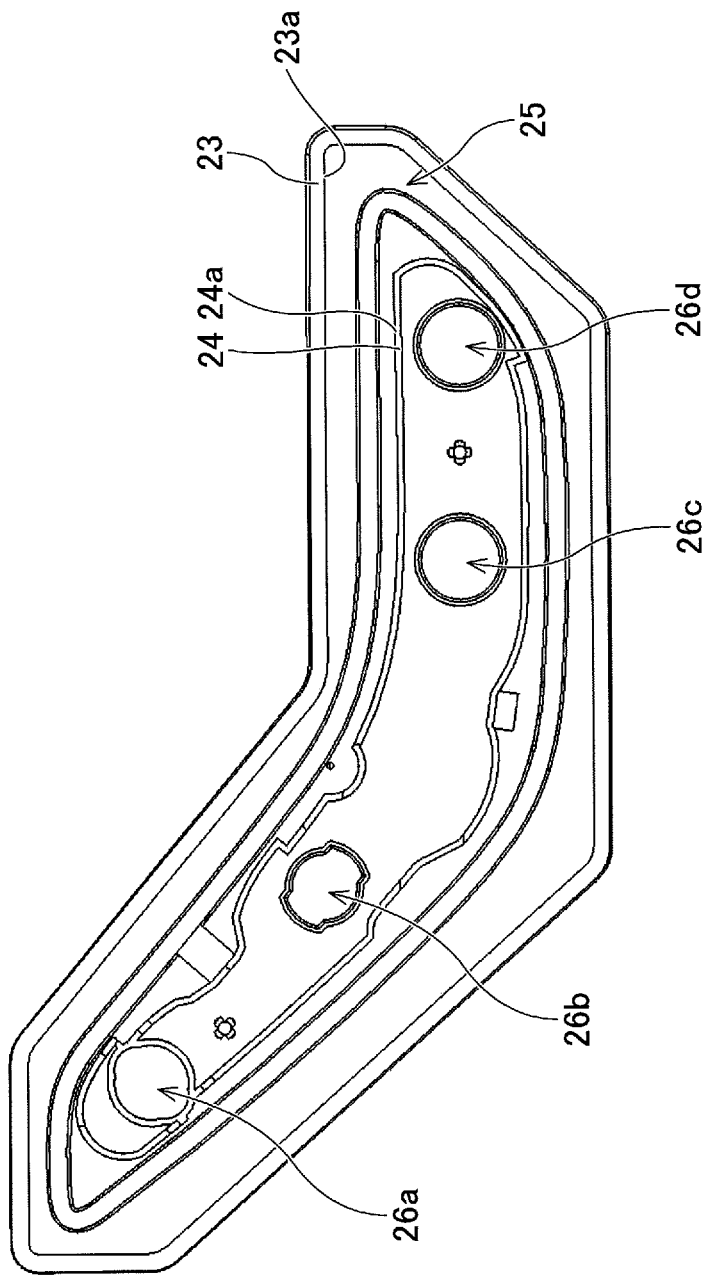
FIG. 13 is a rear view of the lighting panel of the lighting device according to the embodiment.

Next, the lighting panel 20 of the lighting device of the present embodiment is described with reference to FIGS. 11 through 13. FIG. 11 is a rear perspective view, FIG. 12 is a front view, and FIG. 13 is a rear view of the lighting panel 20.

The lighting region 21 is provided on a front side 22 of the lighting panel 20, and an outer wall 23 protruding backward from the periphery of the front side 22 of the lighting panel 20 and an inner wall 24 disposed inside of the outer wall 23 and protruding backward are provided on the back side of the lighting panel 20. In the lighting panel 20, the lighting region 21 is disposed between the outer wall 23 and the inner wall 24, and a groove 25 is formed by the outer wall 23 and the inner wall 24 on the back side of the lighting panel 20. Through holes 26a, 26b, 26c, and 26d for connecting the knobs 31 and 32 to, for example, internal switches are formed in the front side 22 of the lighting panel 20.

The lighting panel 20 is formed of, for example, a white resin such as white polycarbonate. The entire outer surfaces of the outer wall 23 and the front side 22 of the lighting panel 20 excluding the lighting region 21 are painted in black to prevent transmission of light. For example, two-component acrylic urethane paint is used for the black painting. With this configuration, a part of light is transmitted from the inside of the lighting panel 20 to the outside only in the lighting region 21 of the lighting panel 20 and as a result, the lighting region 21 emits light. In the present embodiment, the lighting panel is configured such that the transmittance of light through the lighting region 21 becomes about 35%.

Figure 14:
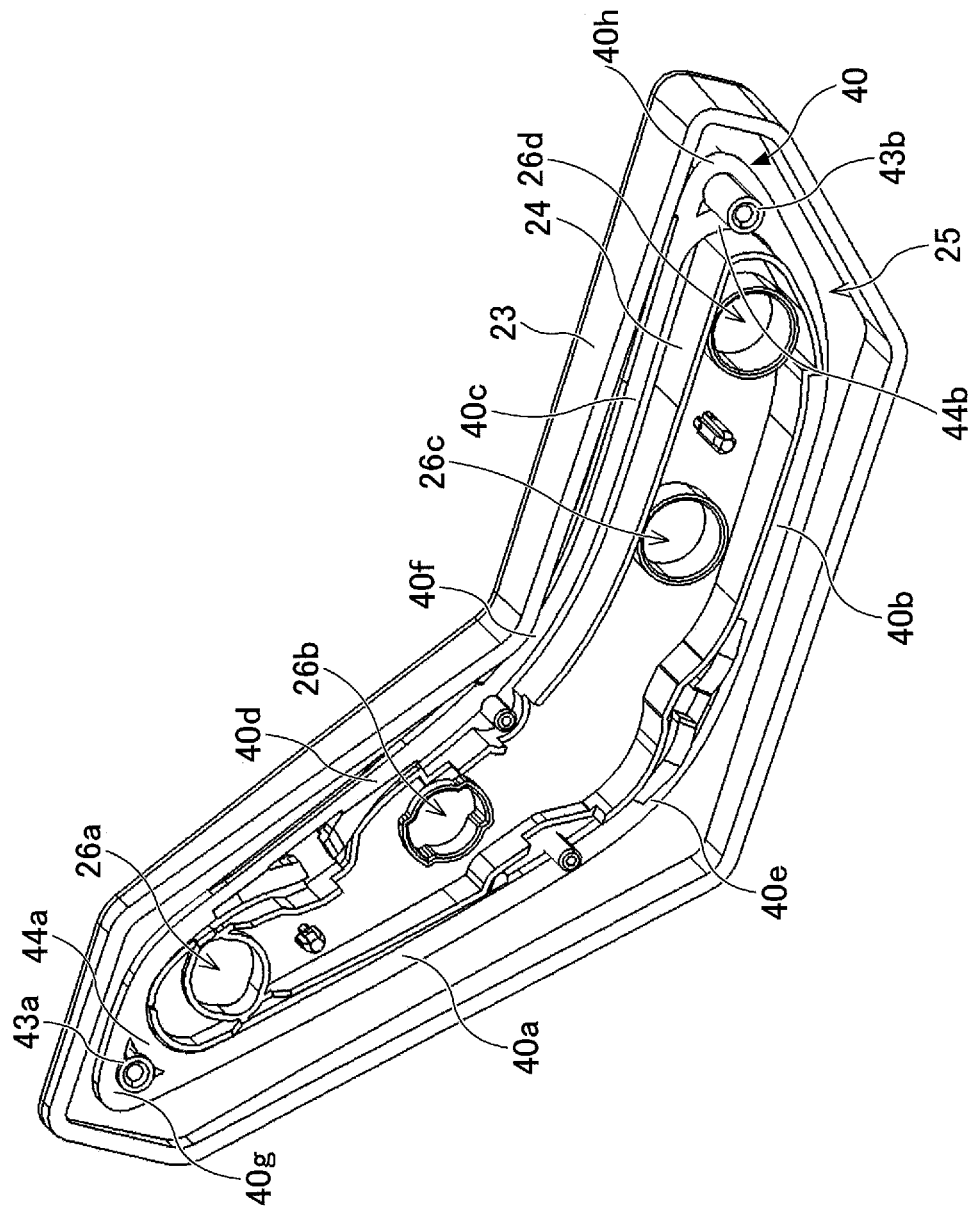
FIG. 14 is a perspective view of the light guide placed in the lighting panel.
Figure 15:
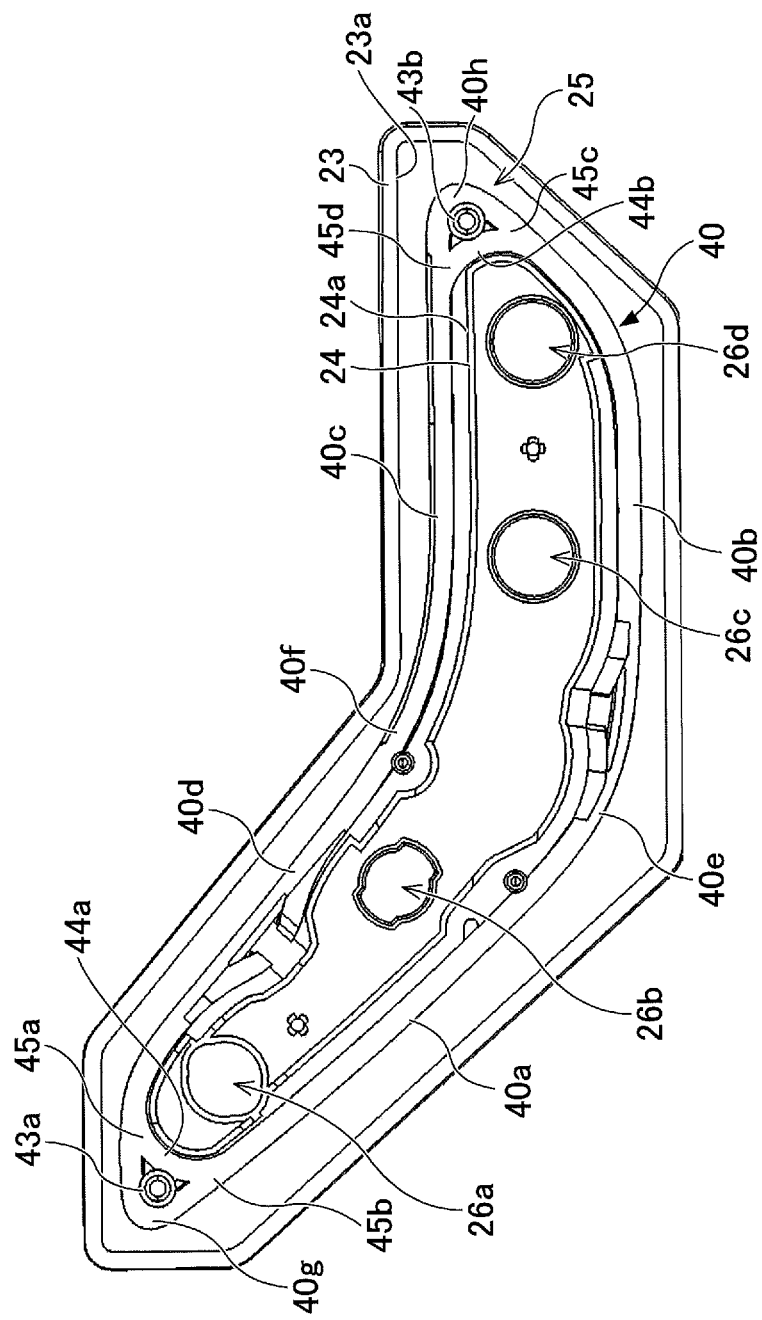
FIG. 15 is a rear view of the light guide placed in the lighting panel.
Figure 16:
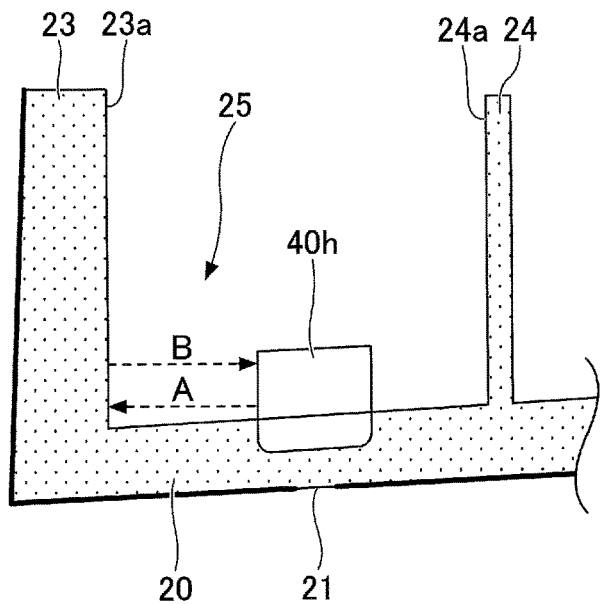
FIG. 16 is a drawing illustrating the lighting device according to the embodiment.

In the lighting device of the present embodiment, as illustrated in FIGS. 14 through 16, the light guide 40 is placed in the groove 25 between the outer wall 23 and the inner wall 24 of the lighting panel 20. Accordingly, when the light guide 40 is in the groove 25, an inner surface 23a of the outer wall 23 faces the light guide 40, and an outer surface 24a of the inner wall 24 faces the light guide 40. FIG. 14 is a perspective view, FIG. 15 is a rear view, and FIG. 16 is an enlarged cross-sectional view of the light guide 40 placed in the groove 25 of the lighting panel 20.

On the back side of the lighting panel 20 of the lighting device of the present embodiment, the inner surface 23a of the outer wall 23 and the outer surface 24a of the inner wall 24 of the lighting panel 20 forming the groove 25 are not painted in black and are white in color. That is, in the groove 25, the surfaces surrounding the light guide 40 are white in color. Therefore, light is reflected by the inner surface 23a of the outer wall 23 and the outer surface 24a of the inner wall 24 of the lighting panel 20.

As described above, in the larger-curvature curved sections 40g and 40h of the light guide 40, light tends to leak to the outside of the light guide 40. However, in the present embodiment, the leaked light is reflected by the white inner surface 23a of the outer wall 23 and the white outer surface 24a of the inner wall 24 and returns to the inside of the light guide 40 or enters the lighting region 21 of the lighting panel 20. This configuration makes it possible to prevent the lighting region 21 from becoming dark.

Specifically, as illustrated in FIG. 16, in the larger-curvature curved section 40h of the light guide 40, even if light leaks from the light guide 40 as indicated by a dotted arrow A, the light is reflected by the white inner surface 23a of the outer wall 23 and travels in a direction indicated by a dotted arrow B. The light traveling in the direction indicated by the dotted arrow B returns into the light guide 40 or enters the lighting region 21 of the lighting panel 20. Thus, this configuration makes it possible to prevent the lighting region 21 from becoming dark.

Figure 17:
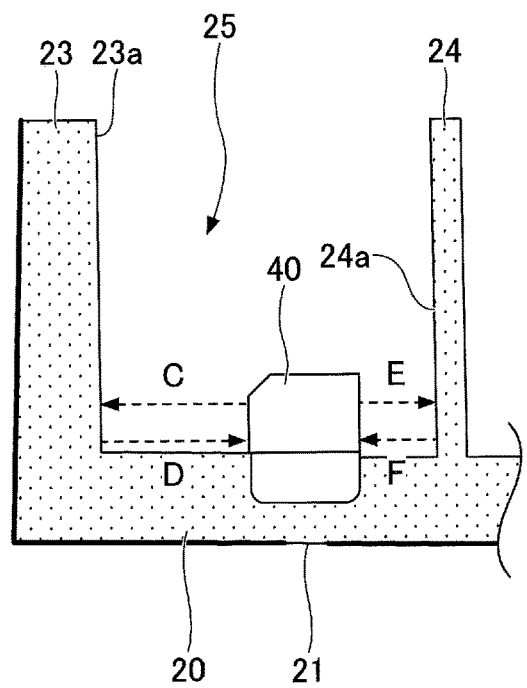
FIG. 17 is another drawing illustrating the lighting device according to the embodiment.

Also, referring to FIG. 17, even if light leaks from the light guide 40 in a direction indicated by a dotted arrow C, the light is reflected by the inner surface 23a of the outer wall 23 in a direction indicated by a dotted arrow D and returns into the light guide 40 or enters the lighting region 21 of the lighting panel 20. Thus, this configuration makes it possible to prevent the lighting region 21 from becoming dark. Further, even if light leaks from the light guide 40 in a direction indicated by a dotted arrow E, the light is reflected by the outer surface 24a of the inner wall 24 in a direction indicated by a dotted arrow F and returns into the light guide 40 or enters the lighting region 21 of the lighting panel 20. Thus, this configuration makes it possible to prevent the lighting region 21 from becoming dark.

Here, in the larger-curvature curved sections 40g and 40h of the light guide 40, light may leak out of the light guide 40 and the amount of light propagating through the light guide 40 may decrease. To compensate for the light leaked out of the light guide 40, for example, the number of light-emitting elements may be increased. However, increasing the number of light-emitting elements increases the costs of the lighting device. The configuration of the lighting device of the present embodiment makes it possible to prevent the luminance in the lighting region 21 of the lighting panel 20 from becoming uneven without increasing the costs of the lighting device.

An aspect of this disclosure makes it possible to provide a lighting device including a lighting region that has a complex shape but can still emit light with uniform luminance.

A lighting device according to an embodiment of the present invention is described above. However, the present invention is not limited to the specifically disclosed embodiment, and variations and modifications may be made without departing from the scope of the present invention.

What is claimed is:

1. A lighting device, comprising:
a light guide that propagates incoming light; and
a lighting panel including a lighting region, wherein
a front side of the lighting panel excluding the lighting region is configured to prevent transmission of light;
the light guide is covered by the lighting panel;
the lighting device is configured such that the light emitted from the light guide passes through the lighting region of the lighting panel for illumination; and
surfaces of the lighting panel surrounding the light guide are white in color, wherein
the lighting panel includes an annular outer wall protruding backward from the front side of the lighting panel where the lighting region is formed, and an annular inner wall provided inside of the outer wall and protruding backward from the front side of the lighting panel;

the lighting region is formed between the outer wall and the inner wall;

the light guide is disposed in a groove between the outer wall and the inner wall;

the outer wall and the inner wall are formed of a material that is same as a material of the surfaces of the lighting panel surrounding the light guide; and the outer wall, the inner wall, and the surfaces of the lighting panel surrounding the light guide are formed as a monolithic structure.

2. The lighting device as claimed in claim 1, wherein each of the light guide and the lighting region has an annular shape and includes sections having different curvatures.

3. The lighting device as claimed in claim 1, further comprising:

an operation knob disposed on the front side of the lighting panel in a region surrounded by the lighting region.

* * * * *